4315X
J. Bonis.
Domestic Oven.
Patented Jan. 19, 1826.
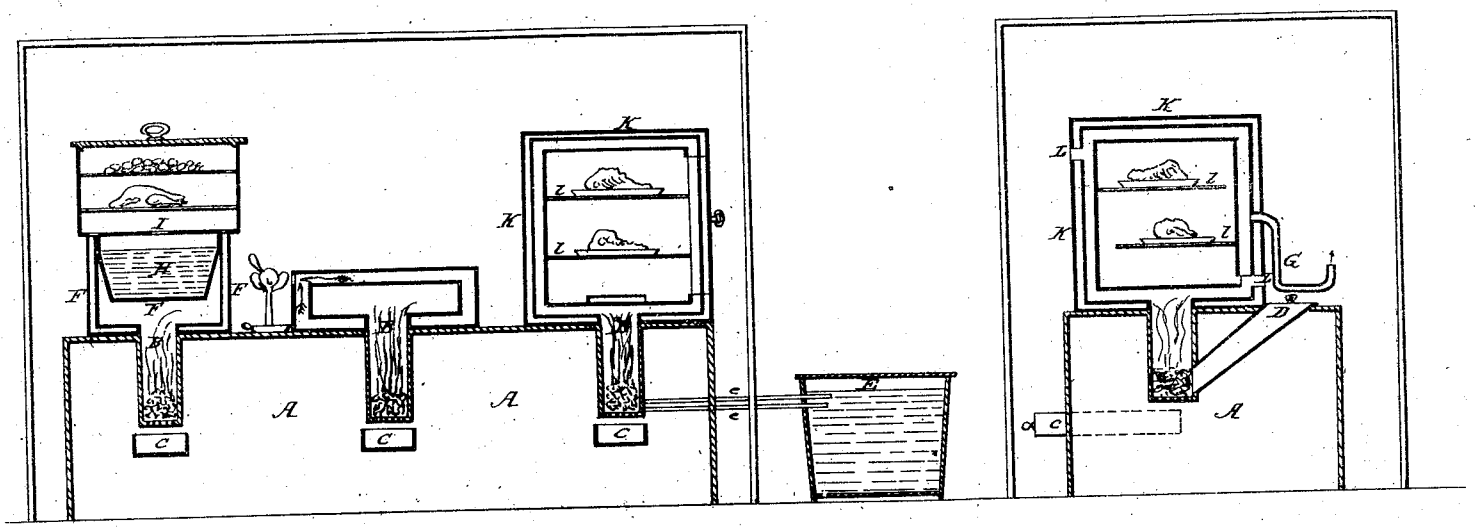
THE NORRIS PETERS CO., WASHINGTON, D. C.

MISSING PAGE TEMPORARY NOTICE

PATENT # 4315X FOR ISSUE DATE 1-19-1826

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text